United States Patent
Carcia et al.

(10) Patent No.: US 9,837,952 B1
(45) Date of Patent: Dec. 5, 2017

(54) REDUCING RESONANT EFFECTS OF REACTIVE LOADS IN ELECTRIC MOTOR SYSTEMS

(71) Applicant: Hamilton Sundstrand Corporation, Charlotte, NC (US)

(72) Inventors: Francis A. Carcia, Enfield, CT (US); Christopher J. Jonke, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/381,651

(22) Filed: Dec. 16, 2016

(51) Int. Cl.
| | |
|---|---|
| *H02P 1/00* | (2006.01) |
| *H02H 7/09* | (2006.01) |
| *H02P 29/50* | (2016.01) |
| *H02P 6/14* | (2016.01) |
| *H02P 27/08* | (2006.01) |

(52) U.S. Cl.
CPC ............... *H02P 29/50* (2016.02); *H02P 6/14* (2013.01); *H02P 27/08* (2013.01)

(58) Field of Classification Search
CPC ...... H02P 1/44; H02P 29/024; H02P 29/0241; H02P 29/025; H02P 3/22; H02P 21/0003; H02P 27/04; H02P 27/06; H02P 27/08; H02P 5/74; B60W 10/06; B60W 10/08; B60W 10/24; B60W 10/26; B60W 20/00
USPC .................. 318/508, 400.22; 363/37, 132
See application file for complete search history.

(56) References Cited

U.S. PATENT DOCUMENTS

| | | | |
|---|---|---|---|
| 4,575,668 A | 3/1986 | Baker | |
| 4,719,550 A | 1/1988 | Powell et al. | |
| 5,642,273 A * | 6/1997 | Lai ............ | H02M 1/34 363/132 |
| 5,714,851 A * | 2/1998 | Antony ................ | B60L 3/003 318/148 |
| 6,906,933 B2 * | 6/2005 | Taimela ................ | H02J 3/32 363/34 |
| 6,917,124 B2 * | 7/2005 | Shetler, Jr. ............ | H02J 9/061 307/66 |
| 6,982,890 B2 * | 1/2006 | Venkataramanan .. | H02M 5/293 363/171 |
| 7,915,760 B2 * | 3/2011 | Evans, Sr. ................ | H02J 3/32 307/43 |
| 8,025,437 B2 * | 9/2011 | Johnson, Jr. ........... | G01K 13/00 327/512 |
| 8,134,438 B2 | 3/2012 | Brooks | |

(Continued)

*Primary Examiner* — Paul Ip
(74) *Attorney, Agent, or Firm* — Cantor Colburn LLP

(57) ABSTRACT

Embodiments herein relate to a drive system for an electric motor. The drive system including a DC bus having a positive terminal and a ground terminal, an inverter connected to the DC bus configured to provide a plurality of motor excitation signals, and an interface cable operably connected to the inverter, and configured to transmit the plurality of motor excitation signals. The drive system also includes a motor remote from and connected to the inverter via the interface cable, the motor responsive to the motor excitation signals and a plurality of snubber circuits, each of the snubber circuits having a first terminal connected to a winding of the motor, and a second terminal operably connected to a first end of a transmission line and a second end of the transmission line is connected to the positive terminal of the DC Bus.

19 Claims, 3 Drawing Sheets

(56) References Cited

U.S. PATENT DOCUMENTS

| | | | |
|---|---|---|---|
| 8,602,144 B2* | 12/2013 | Boskovitch | B60K 6/387 180/65.22 |
| 9,041,327 B2* | 5/2015 | Breitzmann | H02P 3/22 318/400.22 |
| 9,184,003 B2 | 11/2015 | Crane | |
| 2003/0048006 A1* | 3/2003 | Shelter, Jr. | H02J 9/061 307/64 |
| 2004/0085785 A1* | 5/2004 | Taimela | H02J 3/32 363/37 |
| 2005/0078497 A1* | 4/2005 | Venkataramanan | H02M 5/293 363/171 |
| 2009/0152952 A1* | 6/2009 | Evans, Sr. | H02J 3/32 307/80 |
| 2010/0008397 A1* | 1/2010 | Johnson, Jr. | G01K 13/00 374/152 |
| 2010/0145589 A1* | 6/2010 | Kobayashi | B60K 6/46 701/93 |
| 2012/0186391 A1* | 7/2012 | Boskovitch | B60K 6/387 74/661 |
| 2012/0187758 A1* | 7/2012 | Boskovitch | B60K 6/387 307/10.1 |
| 2012/0201056 A1* | 8/2012 | Wei | H02M 5/4585 363/37 |
| 2013/0015704 A1* | 1/2013 | Tsai | H02J 9/062 307/23 |
| 2014/0104896 A1* | 4/2014 | Tallam | H02M 5/4585 363/37 |
| 2014/0321171 A1* | 10/2014 | Fujita | H02M 1/14 363/37 |
| 2014/0368143 A1* | 12/2014 | Breitzmann | H02P 3/22 318/400.22 |
| 2017/0126164 A1* | 5/2017 | Gibbs | H02P 27/04 |

* cited by examiner

REDUCING RESONANT EFFECTS OF REACTIVE LOADS IN ELECTRIC MOTOR SYSTEMS

TECHNICAL FIELD

The subject matter disclosed herein relates generally to the field of motor drives, and more particularly to a motor drive electrical filters to reduce electromagnetic interference (EMI).

BACKGROUND

The typical brushless DC or three phase electric motor driven by a three phase bridge or inverter uses the motor windings to integrate the square wave output drive pulses from the bridge. However, timing and switching of power in an inverter to drive a motor generates significant electromagnetic interference (EMI). When the controller, and thereby the bridge or inverter driver circuit is remotely located from the motor load, a three conductor shielded cable is commonly employed as the interface between the driver and motor. This cable, in conjunction with the reactance of the motor and parasitic winding capacitance, creates high Q factor common mode resonances that result in high frequency damped sinusoidal ringing on the square wave bridge driver output pulse edges. This high frequency ringing increases electromagnetic emissions from the system and interferes with the ability to monitor and control the motor phase currents.

Snubber circuits are typically used to reduce the Q factor of the motor interface at the ringing frequency as a way to control electromagnetic emissions and improve the pulse shape of pulse output by the driver bridge. The snubbers could be grounded to the motor case, but this could increase radiated electromagnetic emission levels due to increased structure currents. Therefore what is needed is a way of reducing the Q factor of the motor interface without increasing structure currents and electromagnetic emissions.

In general, EMI noise can be divided into two major groups: differential mode (DM) noise and common-mode (CM) noise. DM noises are conducted between phases of the motor or inverter. CM noises are conducted together with all phases through the parasitic capacitance of the motor windings to structure ground. CM noises can be problematic for motor drives because CM noises increase the EMI in the motor drive and can damage the motor bearing and winding insulation. Unfortunately, in certain applications, solutions such as adding CM filters to attenuate CM noises are not viable due to the significant weight penalty of each CM filter.

BRIEF DESCRIPTION

According to one embodiment of the invention described herein is a drive system for an electric motor. The drive system includes a DC link having a positive terminal and a ground terminal, an inverter operably connected to the DC link, the inverter configured to provide a plurality of motor excitation signals, an interface cable, the interface cable operably connected to the inverter, and configured to transmit the plurality of motor excitation signals and a motor remote from and operably connected to the inverter via the interface cable, the motor responsive to the plurality of motor excitation signals. The drive system also includes a transmission line having a first end and a second end; and a plurality of snubber circuits, each of the snubber circuits of the plurality of snubber circuits having a first terminal operably connected to a winding of the motor, and a second terminal operably connected to the first end of a transmission line, where the second end of the transmission line is operably connected to the positive terminal of the DC link.

In any of the above method embodiments, or in the alternative, the drive system further including a rectifier bridge, the rectifier bridge operably connected to an alternating current and voltage power source and the DC link, the rectifier bridge configured to rectify the alternating current and voltage to DC to supply the DC link.

In any of the above method embodiments, or in the alternative, the drive system further including that the rectifier bridge is an active rectifier bridge.

In any of the above method embodiments, or in the alternative, the drive system further including a controller operably connected to the inverter, the controller configured to generate control signals to cause the inverter to generate a plurality of motor excitation signals.

In any of the above method embodiments, or in the alternative, the drive system further including that each snubber circuit of the plurality of snubber circuits includes at least two of resistor, a capacitor, and an inductor.

In any of the above method embodiments, or in the alternative, the drive system further including that each snubber circuit of the plurality of snubber circuits includes a resistor and a capacitor connected in series.

In any of the above method embodiments, or in the alternative, the drive system further including that the plurality of snubber circuits are configured to reduce a Q factor of an interface between the motor and the inverter at an oscillation frequency associated with the plurality of excitation signals.

In any of the above method embodiments, or in the alternative, the drive system further including that the plurality of snubber circuits are at least one of disposed closer to the motor than the inverter, disposed within three feet of the motor, and disposed at the motor. Moreover, in any of the above method embodiments, or in the alternative, the drive system further including that the interface cable includes the transmission line. In addition, or in the alternative, the drive system further including that the transmission line is a single shielded wire.

According to another embodiment described herein is an electric motor control system with reduced resonant effects of reactive loads. The electric motor control system including a rectifier bridge, the rectifier bridge operably connected to a power source and a DC link, the rectifier bridge configured to supply the DC link, the DC link having a positive terminal and a ground terminal, an inverter operably connected to the DC link, the inverter converting a DC signal received from the DC link into a plurality of motor excitation signals, and an interface cable, the interface cable operably connected to the inverter, and configured to transmit the plurality of motor excitation signals. The electric motor control system also including a motor remote from and operably connected to the inverter via the interface cable, the motor responsive to the plurality of motor excitation signals; and a plurality of snubber circuits, each of the snubber circuits of the plurality of snubber circuits having a first terminal operably connected to a different winding of the motor, and a second terminal operably connected to a first end of a transmission line, wherein a second end of the transmission line is operably connected to the positive terminal of the DC link.

Also described herein in yet another embodiment is a method of reducing the resonant effects of reactive loads in electric motor systems with a DC link having a positive terminal and a ground terminal and an inverter operably connected to the DC link. The method includes generating a plurality of motor excitation signals with the inverter, carrying the motor excitation signals from the inverter with an interface cable to a motor remote from the inverter, the motor responsive to the plurality of motor excitation signals, and reducing a Q factor of an interface between the inverter and the motor at an oscillation frequency associated with the plurality of excitation signals with a plurality of snubber circuits, each of the snubber circuits of the plurality of snubber circuits having a first terminal operably connected to a different winding of the motor, and a second terminal operably connected to a first end of a transmission line, wherein a second end of the transmission line is operably connected to the positive terminal of the DC link.

In any of the above method embodiments, or in the alternative, the method further including rectifying an alternating current and voltage to DC to supply the DC link with a rectifier bridge, the rectifier bridge operably connected to an alternating current and voltage power source and the DC link.

In any of the above method embodiments, or in the alternative, the method further including generating control signals to cause the inverter to generate a plurality of motor excitation signal with a controller operably connected to the inverter.

In any of the above method embodiments, or in the alternative, the method further including that each snubber circuit of the plurality of snubber circuits includes at least two of resistor, a capacitor, and an inductor.

In any of the above method embodiments, or in the alternative, the method further including that each snubber circuit of the plurality of snubber circuits includes a resistor and capacitor in series.

In any of the above method embodiments, or in the alternative, the method further including disposing the plurality of snubber circuits at least one of closer to the motor than the inverter, within three feet of the motor, and disposed at the motor.

In any of the above method embodiments, or in the alternative, the method further including that the interface cable includes the transmission line.

In any of the above method embodiments, or in the alternative, the method further including that the transmission line is single shielded wire.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
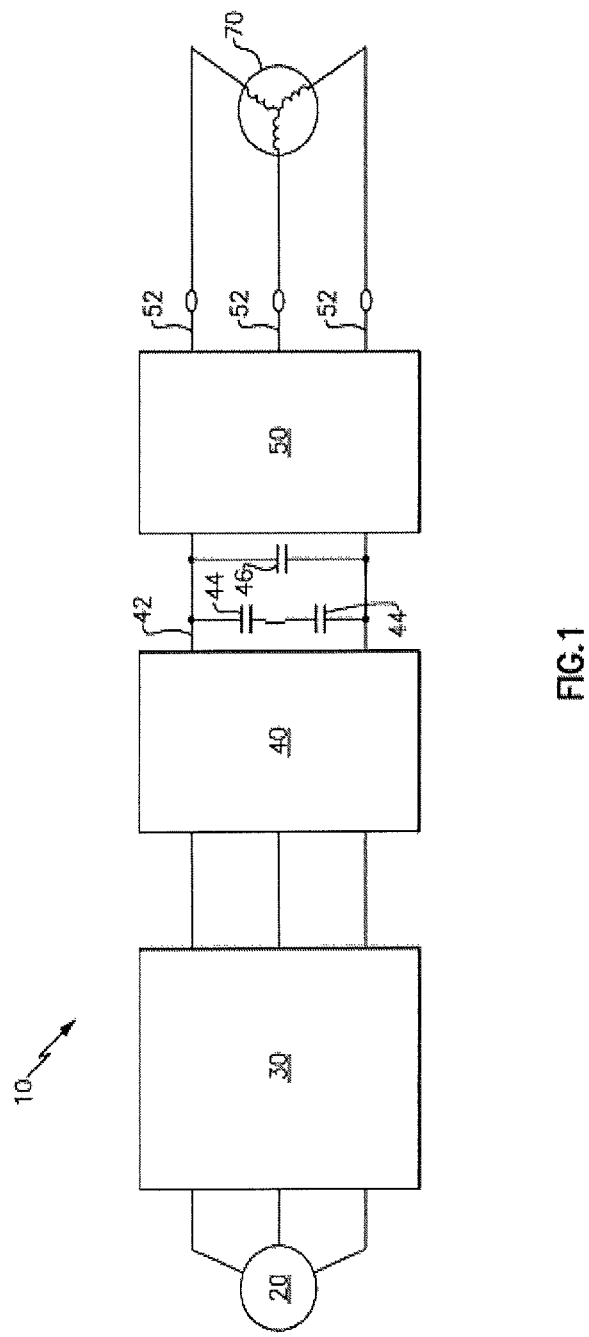
FIG. 1 depicts a block diagram for power system for driving a motor in accordance with an embodiment.

Generally, the switching of power electronics devices in actively controlled inverters also generates electromagnetic interference (EMI). EMI filters are designed to attenuate EMI noise to satisfy the EMI standards, which are defined for particular applications, but EMI filters add weight and complexity for the motor drive system. Thus, alternative means to reduce EMI are commonly considered. In general, embodiments herein relate to a motor drive that receives DC power from a DC bus supplied by an active or passive rectifier bridge. The motor drive is located remotely from the motor and significant EMI can result. A snubber network and transmission line is employed to address the EMI concerns. In particular, the embodiments herein relate a snubber network and its connection between a motor and the DC bus. Embodiments herein set forth a drive and motor system and/or method for control of motor system driven by a motor drive or inverter to control EMI. In an embodiment, three snubbers designed to reduce the circuit Q factor at the system resonant frequency are connected in a "Y" configuration at the motor. In an embodiment, the common point is interfaced back to the DC power bus at the motor bridge through a single shielded conductor transmission line which is isolated from the three shielded motor drive signals.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In one embodiment, the three-phase rectifier and inverter is utilized in a power system of an aircraft. It will be appreciated that while the embodiments described herein are provided with reference to aircraft systems, other applications are possible. For example the described embodiments may be employed in other motor controls systems where inverter motor controls are employed. For example the described embodiments may also be applicable to building systems such as heating ventilation and air conditioning or refrigeration system (HVAC/R). For example, a building HVAC/R can employ a chiller system driven by a power system including a motor drive with inverter as described herein. The drive may also include a power electronics inverter (e.g., as a variable speed alternating current (AC) motor drive) to improve the performance of the chiller system. Similarly, the described embodiments may be utilized in an electric motor system of an elevator system. The elevator system also includes a hoistway having a plurality of lanes or shafts. In each shaft, one or more elevator car travels to deliver passengers to a desired floor of a building. The electric motor system utilizes the power electronics inverter (e.g., as variable speed alternating drive (AC) motor drive) to improve the performance of maneuvering the elevator cars. Other applications and embodiments of the three-phase passive front-end rectifier include powers systems for trains, boats, planes, etc.

FIG. 1 schematically illustrates a motor drive 10 including an active or passive rectifier 40 and a motor drive inverter 50 as may be employed to implement the described embodiments. A three phase power source 20 provides electrical power to the motor drive 10. The current from the three phase power source 20 is passed through the input EMI filter 30 to the rectifier 40. In an embodiment, the active rectifier 40 includes a conventional six-switch voltage source pulse width modulation (PWM) converter. In one example, the active rectifier 40 converts a three-phase AC input power into 750 volts DC output power at a DC link 42. In another embodiment the DC link 42 is supplied from an aircraft battery and a 28 VDC bus. In another embodiment, the rectifier 40 is comprised of a conventional rectifier bridge. In an embodiment the DC link includes a positive terminal and a negative terminal. The DC link 42 may also include two or more DC link mid-point capacitors 44 connecting the terminals of the DC link 42. In addition, one or more bulk capacitor(s) 46 may be arranged in parallel to the two DC link mid-point capacitors 44 across the DC link 42.

The DC link 42 is connected to an input of the motor drive inverter 50. The motor drive inverter 50, in turn, converts the received DC input power into a three phase AC output power on lines 64 to power the motor 70. The motor drive inverter 50 includes a conventional six-switch voltage source PWM inverter. The motor drive inverter 50 receives control signals 52 from controller 54 to generate a set of motor excitation signals 62. The inverter 50 generates high frequency (HF) voltage components that cause HF leakage currents and conducted electromagnetic interference (EMI) noise which flows within power-feeding paths, and between the drive system 10 and the ground. Due to the low-duty cycle utilization of the motor drive system for engine start applications, concerns related to the bearing currents and shaft voltage are reduced, while the common-mode noise associated with the high-frequency leakage currents due to motor windings capacitive coupling to the ground are addressed by incrementally increasing size of the input EMI filter.

The control signals 52 generated by the controller 54 may be pulse width modulation (PWM) signals, commonly used in n-level drives and many inverter control applications. In conventional PWM the duty cycle of the control signals 52 is varied as required based on the output current requirements of the load (in this instance motor 70). For example, if more torque is required in by the motor 70, the pulse width of the control signals 52 is increased, thereby the switching devices of the inverter 50 remain on for a commensurate duration and directing more current to the motor 70. Likewise, if a reduction in the output current from the drive 50 is needed, the duty cycle of the control signals 52 is decreased by the controller 54

In some embodiments, where employed, a switched-mode active rectifier 40 will also generate high frequency (HF) voltage components that cause HF leakage currents and conducted electromagnetic interference (EMI) noise. In some instances, the switching frequency of the active rectifier 40 and the motor drive inverter 50 may be the same, and therefore introduce the same frequency of common mode noise into the system. In alternate examples, the switching frequencies are different (i.e., the inverter 50 switching frequency may be lower in comparison to the active rectifier 40 switching frequency in order to reduce inverter switching losses when operating the inverter 50 at higher output current levels), and introduce different frequencies of common mode noise into the system 10.

Figure 2:
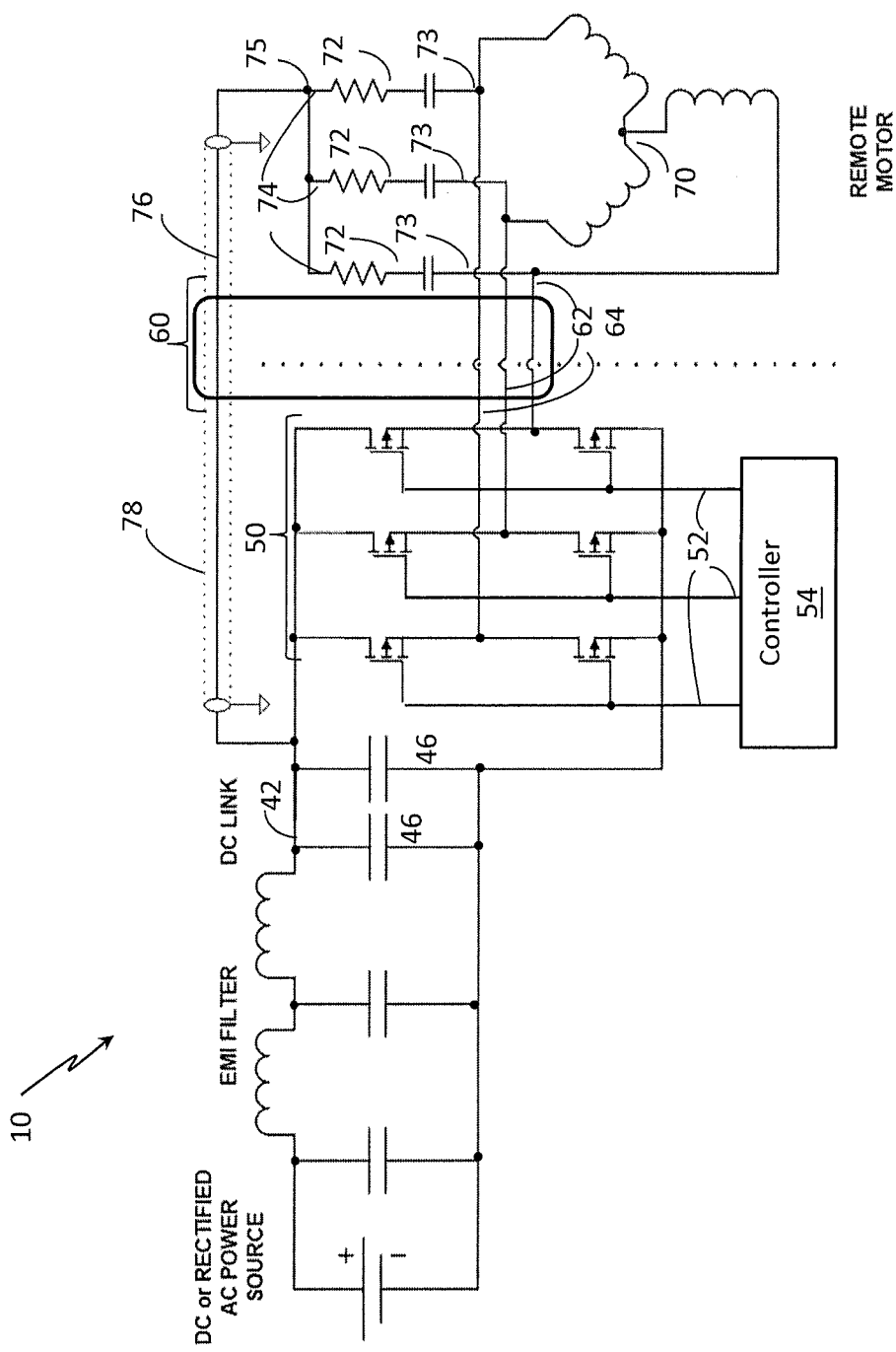
FIG. 2 shows a partial simplified diagram of a motor drive in accordance with an embodiment.

FIG. 2 illustrates a more detailed diagram of a portion of the motor drive 10 including the snubber circuits 72 of an embodiment. In the figure an optional AC power source 20, input EMI filter 30 and rectifier 40 are not depicted for simplicity. In an embodiment, the motor 70 may be part of an actuator, machine, and compressor and the like. In an embodiment the motor 70 is located some distance from the motor drive 10 and in particular the inverter or bridge 50. To facilitate operation a wiring harness or interface cable 60 carries a set of excitation signals 62 to the motor 70. Unfortunately, the bridge or inverter 50 generating the motor excitation signals 62 is remotely located from the motor 70 the cable 60 in conjunction with the reactance of the motor 70 and parasitic winding capacitance in the motor 70 creates high Q factor common mode resonances that result in high frequency damped sinusoidal ringing on the square wave edges of the motor excitation signals 62 This high frequency ringing increases electromagnetic emissions from the system 10 and interferes with the ability to monitor and control the motor phase currents.

To address this ringing, in an embodiment, a snubber circuit 72 is connected to each excitation phase of the motor 70 closer to the motor 70 than the inverter 50. In another embodiment, the snubber circuit 72 is placed within a few feet of the motor 70, for example, within three feet. Finally, in yet another embodiment, the snubber circuit is placed at or very near the motor 70, i.e., within one foot. In particular, in an embodiment, three snubber circuits 72 with a first terminal 73 are connected in a "Y" configuration at the motor 70. In an embodiment the snubber circuits each comprise a resistor and capacitor in series. In another embodiment the snubber circuits 72 may comprise a resistor and an inductor. In yet another embodiment the snubber circuit 72 may comprise at least two of resistor, an inductor, and a capacitor. It should be appreciated that the snubber circuit 72 has been described as a resistor capacitor circuit for the purpose of illustration. Many other circuit configurations and topologies are possible, including, but not limited to more complex resistor capacitor networks, inductive, -resistive networks, inductive capacitive networks, and resistive inductive, capacitive networks. The only requirement is that the snubber circuit 72 operates to reduce the Q factor of the motor interface. The snubber circuit 72 reduces the Q factor of the motor 70 interface at the ringing frequency as way to control electromagnetic emissions and improve the pulse shape or the excitation signals 62 from the from the driver bridge or inverter 50. The snubber circuit 72 second terminal 74 could be commonly connected or grounded locally with the case of the motor 70. However, such an approach could increase radiated emission levels due to increased structure currents. To address this concern, in an embodiment, the snubber circuit 72 second terminals 74 are connected together at a common point shown as reference number 75 that is terminated back to the drive bridge or inverter DC link 42. In an embodiment, a fourth conductor 76 shown as a single shielded conductor transmission line 78 which is isolated from the three shielded motor drive signals 62 in the interface cable 60 between the drive bridge or inverter 50 and the motor 70. Advantageously, this termination scheme for the snubber circuits 72 does not increase high frequency common mode structure currents.

Advantageously, the isolated conductor 76 provides improved damping of the ringing on the drive output pulses by eliminating the common mode coupling between the drive outputs and the return signal with a 4 conductor interface cable. The shielded conductor transmission line is employed because the snubber common point return signal is out of phase with the motor drive transients on the motor drive signals 62. This occurs because the common mode signals on the motor excitation signals carried on the motor interface cable 60 are 180 degrees out of phase with the signal from the common point of the snubber circuits 72, so any shield leakage will reduce the snubber circuit 72 effectiveness in reducing the circuit Q. The circuit Q reduction is greatest when the differential transient voltage across the snubber circuit 72 is maximized. The differential voltage loaded by the resistors of snubber circuits 72 provide a cancelling effect for any radiated emissions.

Figure 3:
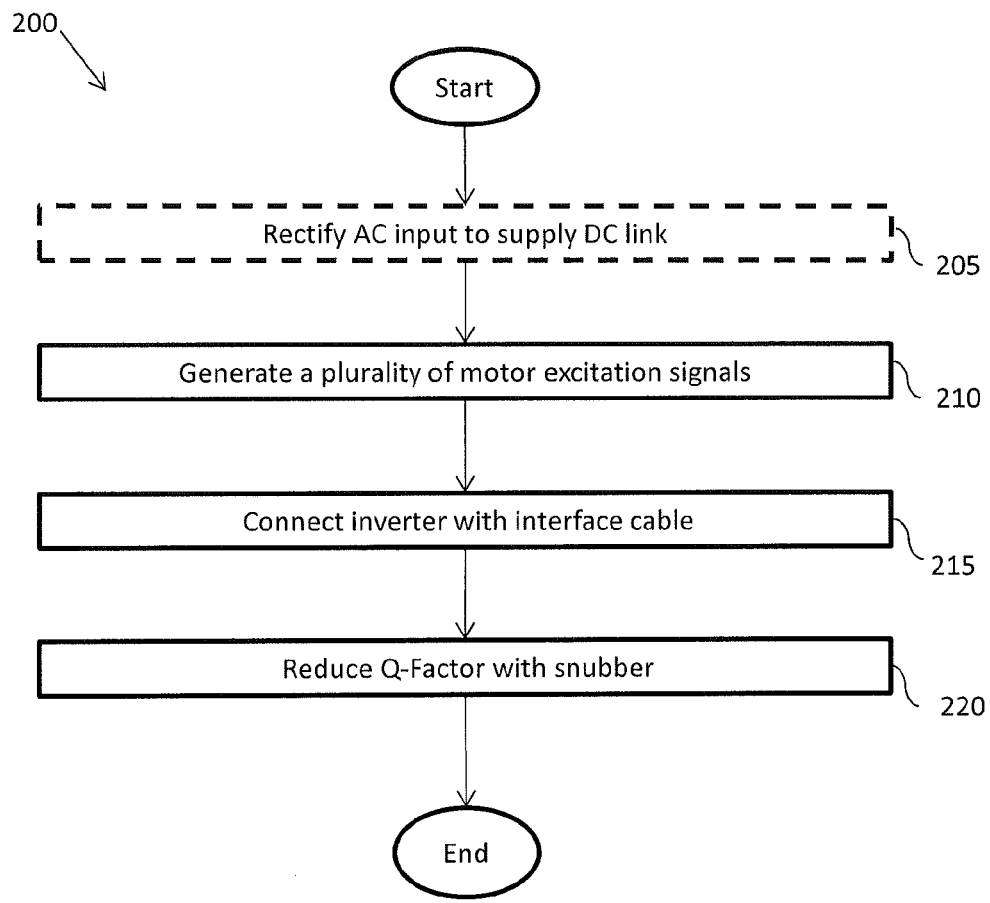
FIG. 3 is a flowchart depicting a method of reducing resonant effects in a motor in accordance with an embodiment.

Turning now to FIG. 3 for a depiction of the method 200 of reducing the resonant effects of reactive loads in an electric motor system 10 in accordance with an embodiment with a DC link 42. The DC link 42 has a positive terminal and a ground terminal. The system also includes an inverter 50 operably connected to the DC link 42. The method 200 initiates with an optional step of rectifying an alternating current and voltage to DC to supply the DC link 42 with a rectifier bridge 40 as depicted at process step 205. The rectifier bridge 40 is also operably connected to an alternating current and voltage power source 20 and outputs to the DC link 42. At process step 210 the method 200 continues with generating a plurality of motor excitation signals 62 with the inverter 50. The inverter 50 is connected with an interface cable 60 to the motor 70 where the motor 70 is remote from the inverter 50 at process step 215. The motor 70 is configured to be responsive to the plurality of motor excitation signals 62. Finally at process step 220 the method continues with reducing a Q factor of an interface of the motor 70 at an oscillation frequency associated with the plurality of excitation signals 62 with a plurality of snubber circuits 72, each of the snubber circuits 72 of the plurality of snubber circuits having a first terminal 73 operably connected to a winding of the motor 70, and a second terminal 74 operably connected to a first end of a transmission line 78, wherein a second end of the transmission line 78 is operably connected to the positive terminal of the DC link 42.

In view of the above, the technical effects and benefits of embodiments of a drive system 10 include achieving reduced CM-voltage and EMI that enables control of a remotely placed motor 70. Eliminating common-mode voltage and ringing for the inverter output results in significant reductions of CM and radiated EMI, and facilitates eliminating a need for CM EMI filters, along with a reduction of an input current ripple, DC side (e.g., DC capacitor) current ripple, and a conducted EMI.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:
1. A drive system for an electric motor, comprising:
a DC link having a positive terminal and a ground terminal;
an inverter operably connected to the DC link, the inverter configured to provide a plurality of motor excitation signals;
an interface cable, the interface cable operably connected to the inverter, and configured to transmit the plurality of motor excitation signals;
a motor remote from and operably connected to the inverter via the interface cable, the motor responsive to the plurality of motor excitation signals;
a transmission line having a first end and a second end; and
a plurality of snubber circuits, each of the snubber circuits of the plurality of snubber circuits having a first terminal operably connected to a winding of the motor, and a second terminal operably connected to the first end of a transmission line;
wherein the second end of the transmission line is operably connected to the positive terminal of the DC link.
2. The drive system of claim 1, further including a rectifier bridge, the rectifier bridge operably connected to an alternating current and voltage power source and the DC link, the rectifier bridge configured to rectify the alternating current and voltage to DC to supply the DC link.

3. The drive system of claim 2, wherein the rectifier bridge is an active rectifier bridge.

4. The drive system of claim 1, further including a controller operably connected to the inverter, the controller configured to generate control signals to cause the inverter to generate a plurality of motor excitation signals.

5. The drive system of claim 1, wherein each snubber circuit of the plurality of snubber circuits includes at least two of resistor, a capacitor, and an inductor.

6. The drive system of claim 1, wherein each snubber circuit of the plurality of snubber circuits includes a resistor and a capacitor connected in series.

7. The drive system of claim 1, wherein the plurality of snubber circuits are configured to reduce a Q factor of an interface between the motor and the inverter at an oscillation frequency associated with the plurality of excitation signals.

8. The drive system of claim 1, wherein the plurality of snubber circuits are at least one of disposed closer to the motor than the inverter, disposed within three feet of the motor, and disposed at the motor.

9. The drive system of claim 1, wherein the interface cable includes the transmission line.

10. The drive system of claim 1, wherein the transmission line is a single shielded wire.

11. An electric motor control system with reduced resonant effects of reactive loads, comprising:
a rectifier bridge, the rectifier bridge operably connected to a power source and a DC link, the rectifier bridge configured to supply the DC link, the DC link having a positive terminal and a ground terminal;
an inverter operably connected to the DC link, the inverter converting a DC signal received from the DC link into a plurality of motor excitation signals;
an interface cable, the interface cable operably connected to the inverter, and configured to transmit the plurality of motor excitation signals;
a motor remote from and operably connected to the inverter via the interface cable, the motor responsive to the plurality of motor excitation signals; and
a plurality of snubber circuits, each of the snubber circuits of the plurality of snubber circuits having a first terminal operably connected to a different winding of the motor, and a second terminal operably connected to a first end of a transmission line, wherein a second end of the transmission line is operably connected to the positive terminal of the DC link.

12. A method of reducing the resonant effects of reactive loads in electric motor systems with a DC link having a positive terminal and a ground terminal and an inverter operably connected to the DC link, the method comprising:
generating a plurality of motor excitation signals with the inverter;
carrying the motor excitation signals from the inverter with an interface cable to a motor remote from the inverter, the motor responsive to the plurality of motor excitation signals;
reducing a Q factor of an interface between the inverter and the motor at an oscillation frequency associated with the plurality of excitation signals with a plurality of snubber circuits, each of the snubber circuits of the plurality of snubber circuits having a first terminal operably connected to a different winding of the motor, and a second terminal operably connected to a first end of a transmission line, wherein a second end of the transmission line is operably connected to the positive terminal of the DC link.

13. The method of claim 12 further including rectifying an alternating current and voltage to DC to supply the DC link with a rectifier bridge, the rectifier bridge operably connected to an alternating current and voltage power source and the DC link.

14. The method of claim 12 further including generating control signals to cause the inverter to generate a plurality of motor excitation signal with a controller operably connected to the inverter.

15. The method of claim 12, wherein each snubber circuit of the plurality of snubber circuits includes at least two of resistor, a capacitor, and an inductor.

16. The method of claim 12, wherein each snubber circuit of the plurality of snubber circuits includes a resistor and capacitor in series.

17. The method of claim 12, further including disposing the plurality of snubber circuits at least one of closer to the motor than the inverter, within three feet of the motor, and disposed at the motor.

18. The method of claim 12, wherein the interface cable includes the transmission line.

19. The method of claim 12, wherein the transmission line is single shielded wire.

* * * * *